United States Patent
Schäfer (12)

(10) Patent No.: US 6,390,723 B1
(45) Date of Patent: May 21, 2002

(54) CHANGING DEVICE FOR SHAFT/HUB CONNECTIONS

(76) Inventor: Erhard Schäfer, Dreisborner Weg, 59757 Arnsberg (DE)

( * ) Notice: Subject to any disclaimer, the term of this patent is extended or adjusted under 35 U.S.C. 154(b) by 0 days.

(21) Appl. No.: 09/556,559

(22) Filed: Apr. 24, 2000

Related U.S. Application Data (63) Continuation-in-part of application No. 08/942,959, filed on Oct. 2, 1997, now Pat. No. 6,056,473.

(30) Foreign Application Priority Data

Oct. 5, 1996 (DE) .......................... 196 41 133

(51) Int. Cl.⁷ .............................. F16B 2/14; F16B 2/18; F16B 7/04
(52) U.S. Cl. ...................... 403/374.2; 403/15
(58) Field of Search ................ 403/374.2, 374.3, 403/31, 15

(56) References Cited

U.S. PATENT DOCUMENTS

| | | | |
|---|---|---|---|
| 1,393,064 A | | 10/1921 | Woodward ................ 403/314 |
| 2,612,376 A | | 9/1952 | Wollner ................... 279/2.12 |
| 3,097,003 A | | 7/1963 | Deve et al. .................. 403/10 |
| 3,803,691 A | * | 4/1974 | Geese et al. ............. 29/200 R |
| 3,898,010 A | * | 8/1975 | Jungbluth et al. ........... 403/15 |
| RE29,968 E | | 4/1979 | Geese et al. ................. 403/15 |
| 4,375,926 A | | 3/1983 | Feller ......................... 403/15 |
| 4,425,050 A | * | 1/1984 | Durand ....................... 403/15 |
| 5,052,843 A | * | 10/1991 | Maurer ....................... 403/15 |
| 5,067,847 A | | 11/1991 | Muellenberg ............... 403/370 |
| 5,125,776 A | * | 6/1992 | Muller et al. .............. 409/234 |
| 5,435,577 A | | 7/1995 | Bauer et al. ............... 279/4.01 |
| 5,476,337 A | | 12/1995 | Mullenberg ................ 403/370 |
| 5,947,626 A | * | 9/1999 | Miller et al. .................. 403/31 |
| 6,039,497 A | * | 3/2000 | Gullberg ..................... 403/16 |
| 6,056,473 A | * | 5/2000 | Schafer .................. 403/374.2 |
| 6,179,512 B1 | * | 1/2001 | Gibson et al. ........... 403/374.1 |

FOREIGN PATENT DOCUMENTS

| | | |
|---|---|---|
| DE | 1 804 857 | 5/1970 |
| DE | 7 018 465 | 5/1970 |
| DE | 83 046 | 7/1971 |
| DE | 22 07 641 | 11/1977 |
| DE | 27 21 337 | 11/1978 |
| DE | 25 49 709 | 1/1985 |
| DE | 36 25 635 | 2/1988 |
| DE | 37 44 284 | 7/1989 |
| DE | 38 33 350 | 4/1990 |
| DE | 40 19 747 | 9/1991 |
| DE | 41 26 897 | 2/1993 |
| FR | 2 492 022 | 10/1980 |
| GB | 1 408 435 | 10/1975 |
| JP | 46-33651 | 10/1971 |
| SU | 626 267 | 9/1978 |

\* cited by examiner

*Primary Examiner*—Lynne H. Browne
*Assistant Examiner*—John B. Walsh
(74) *Attorney, Agent, or Firm*—Collard & Roe, P.C.

(57) ABSTRACT

A changing device for shaft and hub connections, comprising a shaft end, a hub part surrounding the shaft end, and a conical clamping bushing disposed therebetween. There is also provided a mechanism for retaining the clamping bushing on the end of the shaft in a way so that it cannot be lost, and at the same time serves to initiate biaxial displacement of the clamping bushing in relation to the end of the shaft. This permits assembling and dismantling of the hub part, whereby all other parts of the shaft and hub connection can remain mounted on the end of the shaft. This leads to particularly short tool changing times.

22 Claims, 5 Drawing Sheets

CHANGING DEVICE FOR SHAFT/HUB CONNECTIONS

CROSS-REFERENCE TO RELATED APPLICATIONS

This application is a continuation-in-part of U.S. Ser. No. 08/942,959 filed Oct. 2, 1997 corresponding to U.S. Pat. No. 6,056,473.

BACKGROUND OF THE INVENTION

1. Field of the Invention

The present invention relates to a changing device for shaft and hub connections, including a shaft end, a hub surrounding the shaft end, and a bushing disposed in between for radially clamping the hub.

2. The Prior Art

These types of changing devices for shaft and hub connections are known, for example from "Taschenbuch für den Maschinenbau" [Handbook of Mechanical Engineering] (of DUBBEL, 18$^{th}$ edition, G25, illustration 33f).

When the hub is to be changed, however, the drawback is that a safety nut and a safety ring have to be completely removed so that the hub can be pulled off. This leads to costly additional work steps and prolongs the tool changing time.

SUMMARY OF THE INVENTION

An object of the present invention is to develop a changing device for shaft and hub connections of the above type, which permits quick changes of hubs with plain cylindrical bores, while all other parts of the shaft and hub connection remain mounted on the end of the shaft. Furthermore, the device ensures a safe transmission of forces and torques between the shaft and hub, and a precise repeatability of the axial position of the hub relative to the shaft. When the shaft and hub connection is released or clamped, the friction between the components moving in relation to each other is kept as low as possible. Furthermore, it is an object of the invention to permit the location of a shaft bearing close to the face of the hub which is opposite to the side of the shaft end. It is necessary to locate the shaft bearing next to the hub in order to transmit the radial forces generated by the operation of the machine directly from the hub into the shaft and to the shaft bearing, thereby minimizing any elastic deflection of the shaft which might reduce the precision of the rolling process in the machine.

According to the invention, there is provided a conical bushing between the end of the shaft and the hub, and means for safely retaining the bushing on the end of the shaft which at the same time provide an axial displacement of the bushing relative the end of the shaft in both directions. The outside diameter of the means for safely retaining the bushing is at least slightly smaller than the inside diameter of the hub, and these means are located on the side of the hub which points towards the end of the shaft. Axial displacement in both directions is initiated hydraulically so that the shaft and hub connection can be safely clamped and released and the hub can be quickly changed. Furthermore, the axial movement of the bushing during the clamping action presses the hub axially against a shoulder on the shaft which leads to an enhanced adjustment of the hub with regard to its axial position and its face runout.

In another object of the invention for safely retaining the clamping bushing and simultaneously initiating an axial displacement, there is provided a clamping pin rigidly mounted on the end of the shaft, and a nut screwed on to the clamping pin. In this way, the inside step of the bushing engages an intermediate space formed by an outside step of the clamping pin and the nut, to preserve the axial play of the bushing. Thus, a very simple and favorably priced engineering solution is provided with a flawless function.

It is useful if the nut and the outer step are each provided with circular grooves on their sides facing the inside step. Each nut and step displaceably receives a sealing ring and a pressure ring, so that the clamping pin and the nut each have means for building up pressure in the grooves. In this way, an axial displacement of the bushing can be easily and reliably initiated by the nut and the circular step, and the pressure rings inserted in their grooves.

In another useful embodiment of the invention, a fitted ring is provided between the end of the shaft and the clamping pin. The clamping pin can be fitted into the end of the shaft as required, and the required axial path of displacement of the bushing leading to radial clamping of the hub part can be preadjusted.

According to the invention, there is also provided means for safely retaining the bushing so that it cannot be lost, while at the same time biaxially displacing the bushing relative to the end of the shaft. The means for safely retaining the bushing are at least slightly smaller than the inside diameter of the hub part with respect to their spatial width perpendicular to the end of the shaft. The means for safely retaining the bushing are designed in the form of a part permanently mounted on the end of the shaft, and a receiving part movably connected with the part for a double-acting axial support. A means for transmitting an axial component of motion of the receiving part to the axial support is provided, and simultaneously transmitted to the bushing. This assures quick change of the hub part, and a safe clamping of the shaft and hub connection as well. Furthermore, there are comparatively low frictional forces as the changing device is being actuated, and the bushing is only moved axially, which provides a flawless adjustment of the part.

In a further advantageous object of the invention, the receiving part is rotatably connected via an inside thread with the outside thread of the part permanently mounted on the end of the shaft. In this way, there is a biaxial displacement of the bushing in a very easy and reliable way, and very precise paths of displacement can be adjusted.

The invention also provides that the double-acting support on the receiving part is axially fixed, and the biaxial displacement of the receiving part is transmitted to the bushing or an additional part fastened on the bushing. It is very advantageous if the double-acting support is fixed via a shaft nut against a step of the receiving part. This leads to a simple and safe axial securing of the support, and reliable further transmission of an axial component of motion of the receiving part.

In a highly useful embodiment of the invention, provision is made for a sealing ring between the double-acting axial support and the shaft nut, using radial sealing elements. This leads to increased protection of the double-acting axial support and thus a longer useful life.

If the part permanently mounted on the end of the shaft has a flange or step corresponding with a circular cavity of the end of the shaft, a reliable and space-saving connection of the part can be provided, permanently mounted on the shaft end with the end of the shaft, and axial securement of the part can be provided in an easy manner.

Additional axial guidance of the receiving part can be easily provided if the part, permanently mounted on the end of the shaft, has a cylindrical section corresponding with an inside diameter of the receiving part.

To easily actuate the alternative changing device, the receiving part can have a nut-shaped end or, alternatively, a cavity-like recess on the face side.

According to an advantageous embodiment of both alternative embodiments of the invention, the bushing is provided with a conical inside zone and the end of the shaft is conical, so that the conical inside zone corresponds with the conical end of the shaft. In this way, the outside diameter of the bushing can be designed cylindrically, which leads to a design of the hub part that is simpler, and which simplifies the adjustment of the hub part.

Advantageously, the bushing is provided with longitudinal slots, which provides good radial deformability. Moreover, the longitudinal slots are cast in an elastic sealing material in order to prevent any penetration of dust, water, dirt or the like.

The changing devices of the invention can be used very advantageously in connection with floating bearings of hub parts. However, the changing devices according to the invention are also useful in connection with double-sided bearings of the hub part. In this case, it is advantageous if the bushing has zones with a cylindrical surface having a diameter smaller than the inside diameter of the hub part. Thus, the hub part can be easily pushed over the bushing without the risk of damaging the smaller cylindrical outer surface serving as the bearing seat.

BRIEF DESCRIPTION OF THE DRAWINGS

Other objects and features of the present invention will become apparent from the following detailed description considered in connection with the accompanying drawings. It is to be understood, however, that the drawings are designed as an illustration only and not as a definition of the limits of the invention.

In the drawings, wherein similar reference characters denote similar elements throughout the several views.

DETAILED DESCRIPTION OF THE PREFERRED EMBODIMENT

Figure 1:
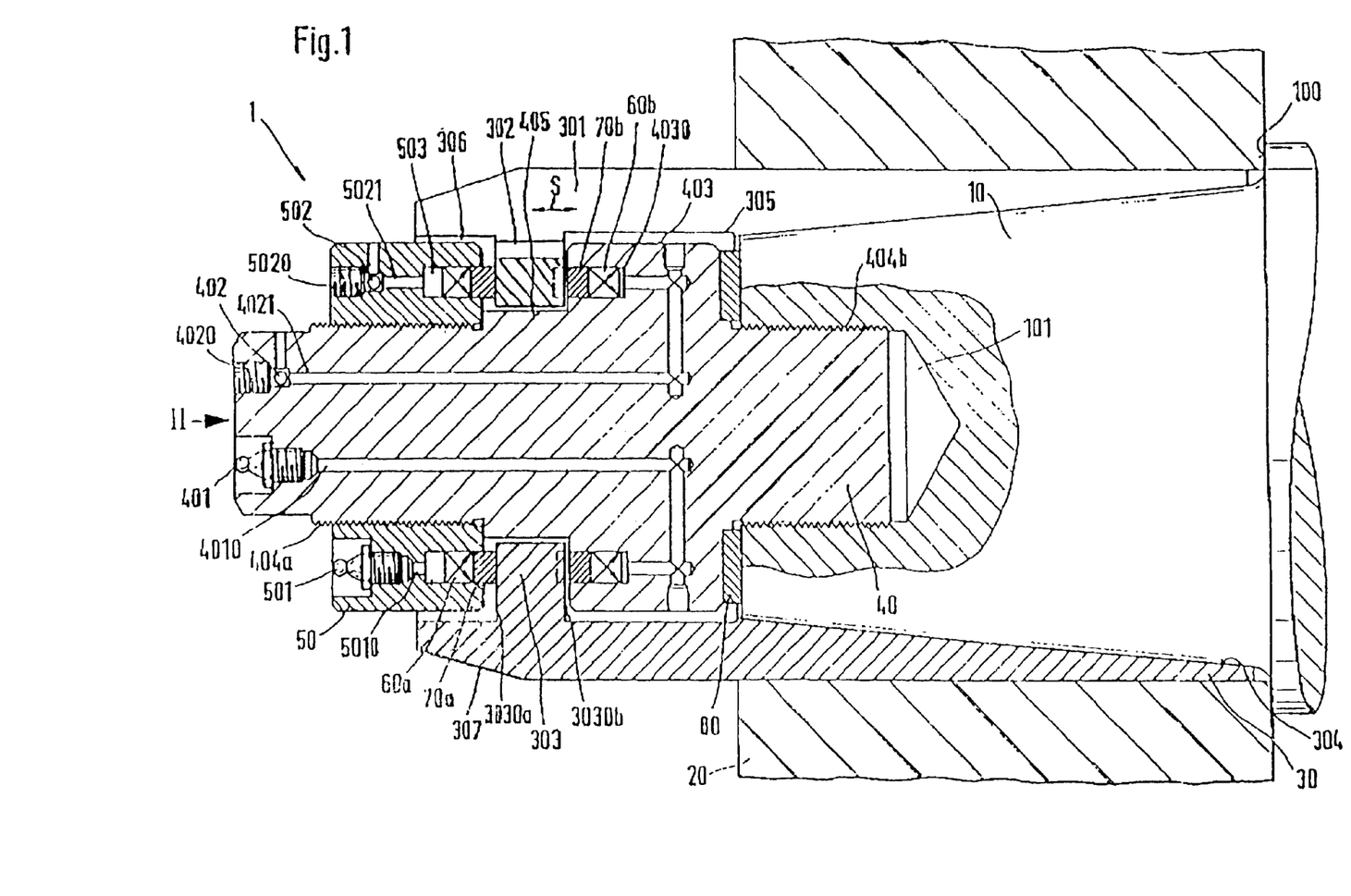
FIG. 1 shows a longitudinal cross section through the line I—I in FIG. 2 of a hydraulically operated changing device according to the invention.

Referring to FIG. 1, the right-hand side shows a conical shaft end 10 surrounded by a hub part 20. Hub part 20 rests against a step 100 of shaft end 10 and may be, for example a profile-shaping straightening roll or comparable tool, which has to be changed as quickly as possible at low expenditure. Changing device 1 according to the invention permits a quick and simple dismantling of hub part 20, on the one hand, and provides a safe and secure support of hub part 20 on shaft end 10. As shown, changing device 1 consists substantially of a clamping bushing 30, a clamping pin 40, and a clamping nut 50. As mentioned before, changing device 1 provides a greatly reduced friction of its parts moving relative to each other, i.e., in the present case clamping bushing 30, clamping pin 40 and clamping nut 50. In order to explain the mode of operation of changing device 1 of the invention, the following description describes how the parts are mounted for easier understanding.

The parts shown in FIG. 1 are substantially rotation-symmetric. On its right side, clamping pin 40 has an outside thread 404b joined at the left by a step 403, extending all around. Prior to assembly, a fitted ring 80 is first pushed over the right outside thread 404b up to step 403 extending all around. With fitted ring 80, it is possible to pre-adjust the required axial path of displacement of clamping bushing 30, which provides a radial clamping of hub part 20. Clamping pin 40 is subsequently completely screwed with its right outside thread 404b into a mating threaded blind-end bore 101 of conical shaft end 10. FIG. 1 shows, furthermore, that within the zone of step 403 extending circumferentially, clamping pin 40 has a groove 4030 extending all around, the groove being open toward the left end of clamping pin 40. On the bottom of circular groove 4030, provision is made for a sealing ring 60b. A pressure ring 70b is placed on top of sealing ring 60b. Circular step 403 is joined by a second shaft step 405, whose outside diameter is distinctly smaller than circular step 403 and slightly larger than the right-hand outside thread 404b of clamping pin 40. Following the second shaft stop 405, provision is made for a left outside thread 404a, the circumference of which approximately corresponds with the right outside thread 404b. The left outside thread 404a is followed by a short end piece of clamping pin 40, which may be designed in the form of a multi-edged or hex nut in order to facilitate screwing of clamping pin 40 into shaft end 10.

FIG. 1 shows that clamping bushing 30 basically has the shape of a can having its bottom and lid missing. Across about ⅔ of its length, starting from the right end, clamping bushing 30 has a conically tapering inside zone 304 corresponding with conical shaft end 10. Conical inside zone 304 is followed by a cylindrical inside zone 305 having a width or bore only slightly larger than the one of circular step 403 of clamping pin 40. Following the cylindrical inside zone 305, provision is made for a step 303 extending all around, the latter in turn being followed by a cylindrical inside zone 306. The latter has approximately the same diameter as cylindrical inside zone 305. However, the inside diameter of inside step 303 is only slightly larger than the outside diameter of the second shaft stop 405 of clamping pin 40. It will be shown later that this is required in order to permit a smooth axial reciprocation of clamping bushing 30 on shaft end 10, and to minimize the frictional forces between clamping bushing 30 and clamping pin 40.

Furthermore, FIG. 1 shows that starting from its right-hand end, clamping bushing 30 has a substantially cylindrical outer contour. Only in the zone of the left cylindrical inside zone 306 is provision made for a conical outer zone or surface 307, tapering toward the left end of clamping bushing 30, so that hub part 20 can be later pushed more easily over clamping bushing 30.

Figure 2:
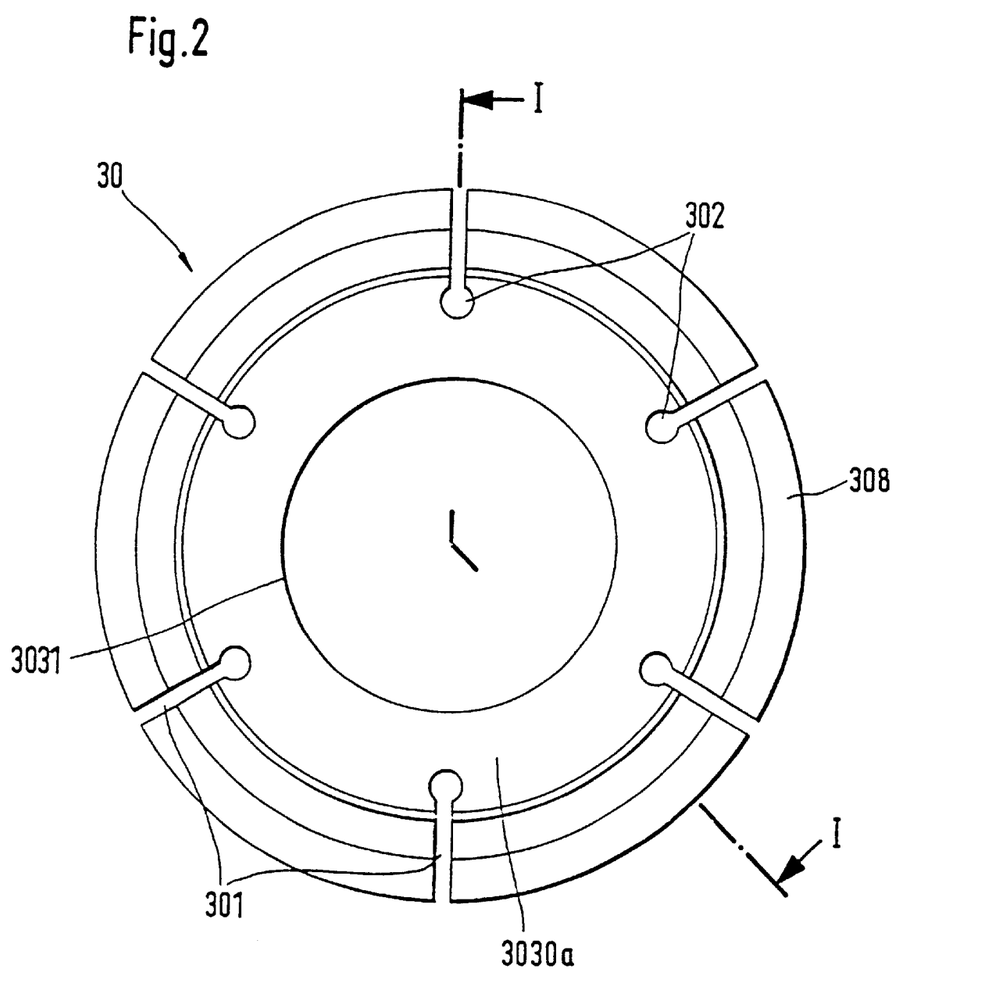
FIG. 2 shows a front view of part of the changing device, specifically the clamping bushing of FIG. 1, whereby only the part is represented.

FIGS. 1 and 2, furthermore, show that clamping bushing 30 has longitudinal slots 301 uniformly distributed over its circumference. Within the zone of inside step 303 of the clamping bushing, their slots change into the axial bores 302. Clamping bushing 30 is circumferentially divided by the longitudinal slots 301 into clamping wing sections 308, which can be radially expanded outwardly, which, as explained herein below, is required for a flawless radial clamping effect of clamping bushing 30. Axial bores 302 serve only to reduce the notch effect. Following assembly, the longitudinal slots 301 can be cast in elastic sealing compound in order to prevent the penetration of dust or the like.

As mentioned above, when the changing device is assembled, clamping pin 40 is first tightly screwed into conical shaft end 10. Subsequently, clamping bushing or collet 30 is pushed over clamping pin 40 on shaft end 10 from the left side. After clamping bushing 30 has been completely pushed over clamping pin 40 and shaft end 10, clamping nut 50 is then screwed to the left outer thread 404a of clamping pin 40 until it rests against the second shaft step 405. The maximum outer dimensions of clamping nut 50, which, for example, may be a multi-edge nut, are slightly smaller than the inside diameter of the cylindrical inside zone 306, which now surrounds about half of clamping nut 50. In this way, an axial movement of clamping bushing 30 is not obstructed by the outside dimensions of clamping nut 50.

The width of clamping nut 50 conforms to approximately the width of step 403 of the clamping pin extending circumferentially so that clamping nut 50 also has sufficient space for circular groove 503, with the opening thereof being directed toward the inside step 303 of clamping bushing 30 and being approximately aligned with groove 4030. As in circular groove 4030, there is provided both a sealing ring 60a and pressure ring 70a in circular groove 503.

In FIG. 1, after clamping nut 50 has been installed as described above, changing device 1 forms a clamping system which is closed within itself and rigidly connected with shaft end 10. Its axial path of displacement S is limited by clamping nut 50 and step 403 of clamping pin 40, and remains available only to inside step 303 of clamping bushing 30. As opposed to what has been stated above, changing device 1 according to the invention can be screwed to shaft end 10 by means of clamping pin 40 also in the form of a pre-assembled unit comprised of clamping pin 40, clamping bushing 30 and clamping nut 50.

FIG. 1 shows changing device 1 in the "clamped" operating condition. In this condition, circular groove 503 is acted upon by oil pressure via a hydraulic nipple 501 of clamping nut 50. Through a hydraulic duct 5010, pressure build-up is effected on sealing ring 60a and thus also on pressure ring 70a downstream, whereby pressure ring 70a is pressed against the left side 3030a of inside step 303 of clamping bushing 30, attempting to push the latter as far as possible in the direction of conical shaft end 10. Through longitudinal slots 301 of clamping bushing 30, it is now possible for clamping wings 308 to spread radially outwardly in the direction of shaft end 10 in proportion to the axial path of displacement S, which results in a clamping effect between clamping bushing 30 and hub part 20, on the one hand, and shaft end 10 on the other hand. This clamping effect is substantial, so that changing device 1 is suitable for transmitting high torque, as well as radial and axial forces between the shaft and the hub even without interconnecting a fitted spring.

To insure safe clamping, a small gap has to be provided between right side 3030b of step 303 and circular step 403 of clamping pin 40, when the changing device is in the clamping condition, as shown in FIG. 1. This gap can be adjusted by means of fitted ring 80, which has to be ground to the required thickness. Furthermore, it is necessary to make sure that in the "clamped" operating mode, clamping bushing 30 can be displaced as far as possible to the right in the direction of shaft end 10. For this reason, provision is made for a vent 402 in clamping pin 40, which, upon actuation of a venting screw 4020, releases vent ducts 4021, so that pressure ring 70b, which still may project from groove 4030, is capable of yielding smoothly to the right, in the direction of the bottom of the groove. It has to be noted here that hub part 20, which prior to clamping is loosely pushed onto clamping bushing 30, is forced, in a defined way, against step 100 of shaft end 10 by the movement of clamping bushing 30 to the right. This represents an important adjustment advantage.

When the changing device is to be changed from operating mode "clamp" to operating mode "released", the procedure is as follows:

Oil is supplied via a hydraulic nipple 401 of clamping pin 40 and received by sealing ring 60b via a hydraulic duct 4010. Similar to the way the "clamping" mode worked in groove 503, oil pressure now builds up in circular groove 4030, and acts on pressure ring 70b via sealing ring 60b. Pressure ring 70b is thereby pressed in the axial direction to the left, out of groove 4030, and thereby acts directly on the right side 3030b of inside step 303, causing the latter to be displaced to the left. Together with the displacement of inside step 303, the entire clamping bushing 30 is simultaneously forced axially to the left as well. Due to the concentricity, clamping wings 308 again move radially inward, returning to their starting positions, which finally cancels the clamping effect between the participating components (shaft end 10, clamping bushing 30, hub part 20).

FIG. 1 shows that the maximum axial displacement path S of clamping bushing 30 is limited in this connection by the right side of clamping nut 50, the latter representing a stop for the left side 3030a of inside step 303. Naturally, the release of clamping bushing 30 functions flawlessly only if provision is also made for a vent 502 of circular groove 503 in this case, which, upon actuation of a vent screw 5020, releases a vent duct 5021, so that pressure ring 70a, which may still project, is capable of yielding without problems to the left in the direction of the bottom of the groove. Since the inside diameter 3031 (FIG. 2) of inside step 303 is slightly larger than the outside diameter of the second shaft step 405 of clamping pin 40, then a slight axial displacement of clamping bushing 30 is not obstructed.

Hub part 20 can thus be pulled without any problem from clamping bushing 30 to the left, and thus from shaft end 10 and replaced by another hub part. It has to be noted that a suitable fit is maintained between the outside diameter of clamping bushing 30 and the inside diameter of hub part 20. When changing device 1 is in the released condition, this arrangement permits an easy axial displacement of hub part 20 on clamping bushing 30.

As described above, clamping pin 40, clamping bushing 30 and clamping nut 50 form a so-called closed system, which remains connected with shaft end 10 both in the "released" and "clamped" modes, wherein there is only a slight axial play remaining available to clamping bushing 30. This play can be used to clamp and release hub part 20. Thus, it is possible for a quick and simple "overhead" assembly and dismantling of hub part 20. It is also noted that when bushing 30 is clamped and released, it executes a pure axial displacement S, without rotation. No frictional forces occur between clamping bushing 30 and clamping pin 40 or clamping nut 50 and pressure rings 70. This leads to a very reliable mode of operation of changing device 1.

Figure 3:
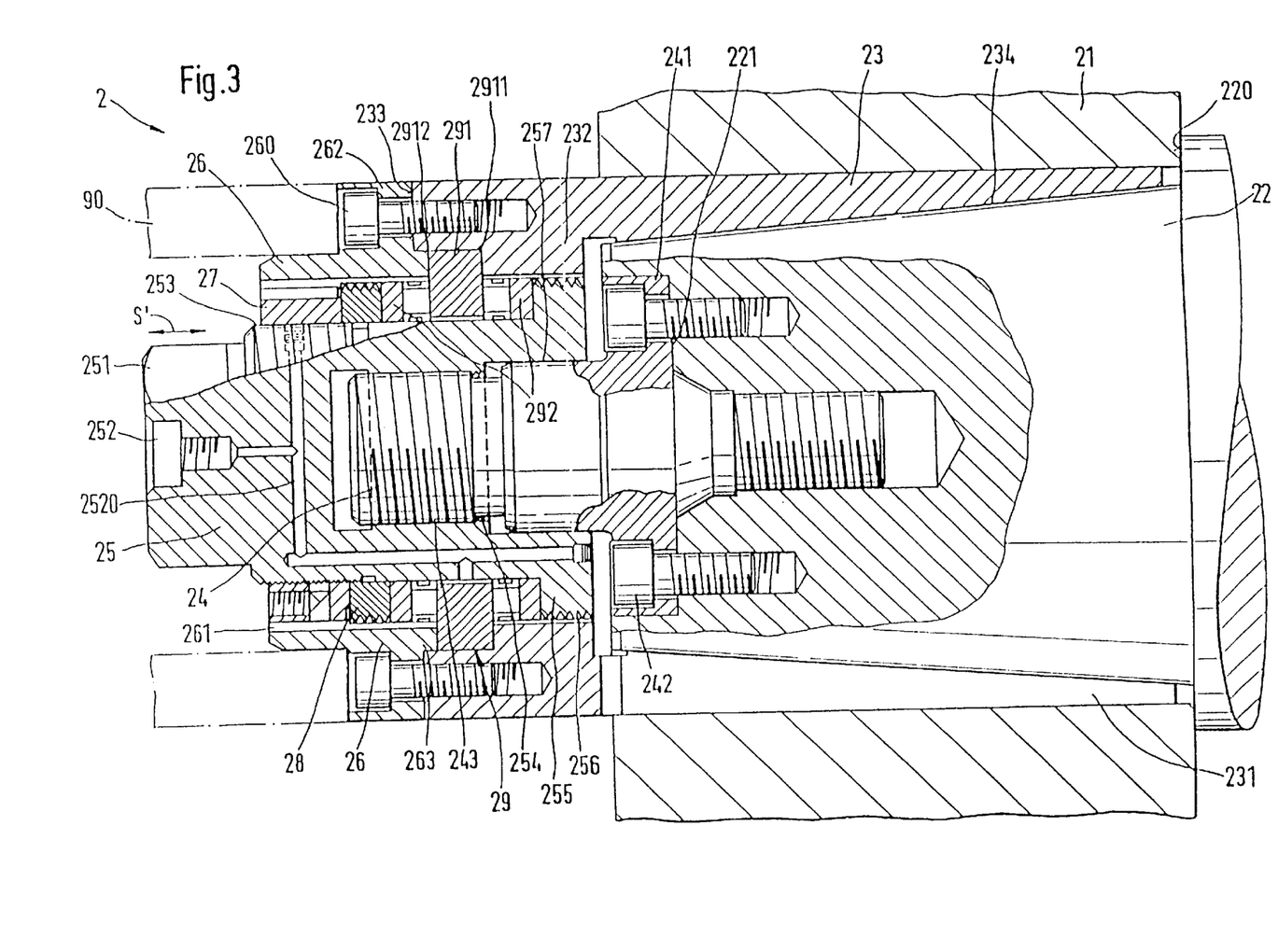
FIG. 3 shows a longitudinal cross section through a mechanical changing device according to the invention.

Referring to FIG. 3, there is shown an alternative embodiment consisting of a changing device 2 according to the invention. As opposed to the first alternative of FIG. 1, which is operated hydraulically, this embodiment is actuated mechanically. The parts shown in FIG. 3 are substantially rotationally symmetric as well, whereby changing device 2 substantially consists of a threaded bolt 24, a threaded bushing 25, a clamping bushing 23, a sleeve-like retaining ring 26, a shaft nut 27, and a double-acting axial bearing 29. As explained in greater detail below, these parts cooperate with a conical shaft end 22 and a hub part 21 so that a rapid and safe clamping of hub part 21 on shaft end 22, and also an easy release of hub part 21 can be accomplished any time. Moreover, when changing device 2 is clamped, hub part 21 is pressed, in a defined way, to the right against a step 220 of shaft end 22.

On the left side, threaded bolt 24 has an outside thread 243, and at its right end, a flange 241 with through extending bores for screws 242. To assemble changing device 2, threaded bolt 24 with its flange 241 is first inserted in a circular hole 221 of the conical shaft end 22 and fastened by means of screws 242. Subsequently, clamping bushing 23 is pushed over the conical shaft end 22. FIG. 3 shows that in this case too, clamping bushing 23 has on its outside a cylindrical surface, and on its inside a conical inside surface 234 extending over about ⅔ of its length, its inside zone 234 corresponding with the concentricity of shaft end 22. Furthermore, there are also provided longitudinal slots 231, comparable to the slots of clamping bushing 30 shown in FIG. 1, in order to permit a radial spreading of clamping bushing 23 and thus a clamping effect. Clamping bushing 23, furthermore, has an inside step 232 extending around its left front third, the inside diameter of the step approximately corresponding to the diameter of the circular hole 221 of shaft end 22. In addition, at its left end, clamping bushing 23 has a plane surface 233.

Threaded bushing 25 is provided with an inside thread 254, which can be screwed to the outside thread 243 of threaded bolt 24. On the right side, inside thread 254 is followed by a slightly larger inside diameter 257.

Furthermore, at its right-hand side on the outside, threaded bushing 25 has a step 255 with sealing elements 256, whereby the outside diameters of the elements approximately correspond with the inside diameter of inside step 232. Double-action axial bearing 29 is pushed onto threaded bushing 25 up to step 255, the bearing having a center ring 291 and two lateral rings 292. The outside diameter of center ring 291 is preferably slightly smaller than the inside diameter of clamping bushing 23 surrounding the ring. A sealing ring 28 is mounted later for sealing. Double-action axial bearing 29 and sealing ring 28 are subsequently secured by means of shaft nut 27 which, via an outside thread 253 of threaded bushing 25, is screwed to the latter. It is shown, furthermore, that threaded bushing 25 adjoining outside thread 253 is a nut- or hex-shaped end 251, in which provision is made for a connection 252 for lubricating ducts 2520. These lubricating ducts may later serve for lubricating double-action axial bearing 29.

Finally, retaining ring 26 has to be screwed on to clamping bushing 23. Retaining ring 26 has a flange 262 which, when compared to the right side of retaining ring 26, is slightly recessed to the left, thus forming a right step 263 having an outside diameter approximately corresponding with the outside diameter of center ring 291 of double-action axial bearing 29.

Retaining ring 26 is thus pushed over threaded bushing 25 until the right-hand step 263 abuts the left side 2912 of center ring 291. Subsequently, retaining ring 26 is screwed on to the face 233 of clamping bushing 23 by means of screws 260. It is important that after retaining ring 26 has been screwed on, center ring 291 is inserted without play between inside step 232 of clamping bushing 23, on the one hand, and the right hand step 263 of the retaining ring, on the other hand, so that axial forces can be transmitted free of play. For this purpose, a minimum gap has to remain available between face 233 of clamping bushing 23 and flange 262 of retaining ring 26.

FIG. 3 shows that after changing device 2 has been assembled, threaded bushing 25 and the parts mounted on this bushing form a unit which, when changing device 2 is actuated, executes an axial displacement S', so that only threaded bolt 24 remains stationary in its position. This is explained in greater detail on the mode of operation of changing device 2.

Assumed first that changing device 2 according to FIG. 3 is in the "clamped" operating mode. To release its clamping effect, i.e., the clamping effect of clamping bushing 23 versus hub part 21 and shaft end 22, threaded bushing 25 has to be turned counterclockwise at its nut-like end 251 by means of a suitable tool. This puts threaded bushing 25 into an axial motion S' and an axial flow of force starts to act on the right-hand step 263 of retaining ring 26, starting from step 255 via center ring 291.

Due to the fact that retaining ring 26 and clamping bushing 23 are screwed together, an axial movement takes place simultaneously to the left of clamping bushing 23. The mode of operation is similar to the one described for FIG. 1. The clamping wings of clamping bushing 23, created by the longitudinal slots 231, are relieved axially inwardly and thereby release the clamp. Hub part 21 can be easily pulled off to the left via clamping bushing 23 and flange 262 disposed and aligned adjacent to the bushing. Thereafter, a replacement hub part can be pushed onto bushing 23. This change of parts can be helped by providing a tubular pull-off aid or tool 90, which is applied to retaining ring 26 and aligned with clamping bushing 23. This pull-off aid, of course, could be used also in connection with the changing device according to FIG. 1.

Subsequent clamping of hub part 21 is accomplished by turning the nut-like end 251 to the right. This initiates an axial force via shaft nut 27, which is transmitted by the right side 2911 of center ring 291 to inside step 232 of clamping bushing 23. Analogous to the action of the clamping bushing described in connection with FIG. 1, a radially acting clamping effect is obtained through clamping bushing 23 in this case as well.

As the outside diameters of the lateral rings 292 are slightly smaller than inside bore 261 of the retaining ring, or the inside diameter of inside step 232, a smooth rotary relative motion is possible between threaded bushing 25 and clamping bushing 23 and retaining ring 26. Additional axial guidance of threaded bushing 25 is assured by its right-hand inside diameter 257, the latter corresponding with a matching step of threaded bolt 24, such step adjoining flange 241.

It is clear that the "overhead" dismantling and mounting of hub part 21 is made possible also by the alternative embodiment of changing device 2 of the invention according to FIG. 3, whereby all elements of the changing device may remain on shaft end 22. Changing hub part 21 is thus substantially facilitated and accelerated in this way. In the present case, nearly no frictional forces occur between clamping bushing 23 and threaded bushing 25 when clamping device 2 is actuated, except for negligible rolling friction of bearing 291, so that clamping bushing 23 executes a purely (and defined) axial motion.

Figure 4:
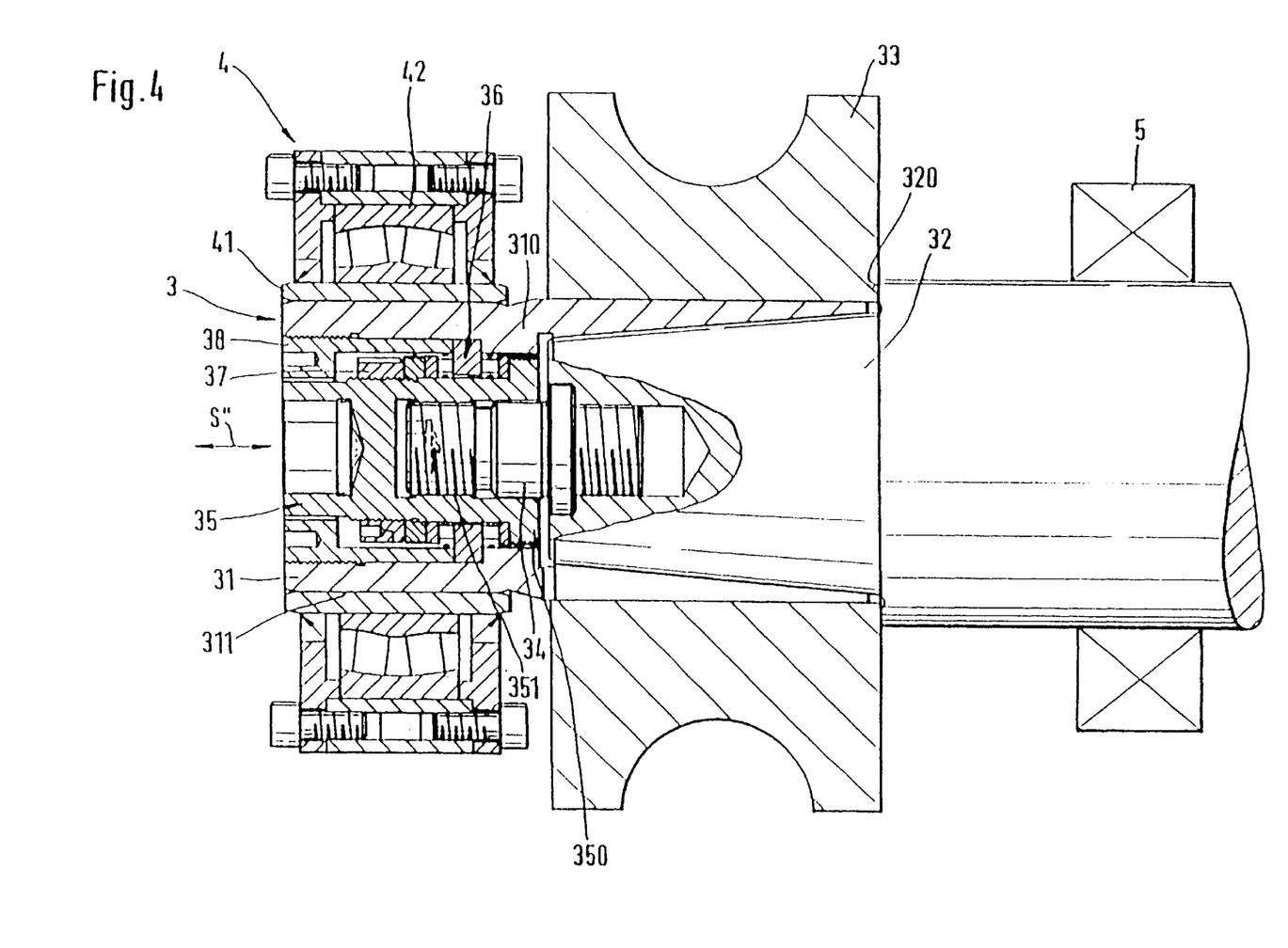
FIG. 4 shows a longitudinal cross section through a mechanical changing device according to the invention, in connection with a double-sided bearing.

FIG. 4 shows in detail another application of the changing device of the invention. In the present case, the use of a mechanically actuated changing device 3 is shown. The mode of operation of this device is comparable to changing device 2 of FIG. 3. Changing device 3 is used in the present case not for clamping a floatingly supported hub part but a hub part 33 supported in a double-sided way. Double-sided support is effected by a bearing stand 4 (indicated only) and a second bearing 5. Double-sided bearings are required in cases where radial forces are particularly high.

As in the case of changing device 2 of FIG. 3, changing device 3 comprises a threaded bolt 34 screwed into a shaft end 32, with a threaded bushing 35 with an inside thread 351 being rotatably connected with the bolt. Alternatively, threaded bushing 35 could be arranged with its inside thread 351 directly on the shaft and threaded bolt 34 omitted. A double-acting axial bearing 36 is secured on threaded bushing 35 by means of a shaft nut 37 against a step 350 of threaded bushing 35. A clamping bushing 31 serves to radially clamp hub part 33. Furthermore, there is also provided a sleeve-like retaining ring 38, which presses the double-action axial bearing 36 against an inside step 310 of clamping bushing 31, this step extending all around. This causes axial displacements S", which are effected by turning threaded bushing 35, to be transmitted to clamping bushing 31. Within the range of its left end, retaining ring is provided with an outside thread, which is screwed into an inside thread at the left end of clamping bushing 31. The left end of clamping bushing 31 has a cylindrical receiving surface 311 for a bearing sleeve 41, on which is mounted a bearing 42 of bearing stand 4. The outside diameter of receiving surface 311 is slightly smaller than the outside diameter of clamping bushing 31 which receives hub part 33.

When hub part 33 is to be exchanged, bearing stand 4 is first pulled off so that the left end of changing device 3 is exposed. By turning threaded bushing 35 counterclockwise, threaded bushing 35 executes a motion to the left and, due to the forces transmitted further by axial bearing 36, clamping bushing 31 is driven to the left as well. Hub part 33 is released and can be pulled off to the left via changing device 3.

When hub part 33 is clamped, threaded bushing 35 is turned to the right, whereby clamping bushing 31 is also displaced to the right, hub part 33 is pushed in a defined way against a stop 320 of shaft end 32, and thus hub part 33 is radially clamped.

Thus, with the arrangement according to FIG. 4, the radial forces are transferred directly towards the left onto bearing sleeve 41 and bearing stand 4 by clamping bushing 31 clamped between hub part 33 and conical shaft end 32. It does not matter whether threaded bolt 34 is screwed into shaft end 32 or if inside thread 351 is arranged directly on the extended shaft end since bolt 34 and shaft end 32 do not have to absorb transverse forces.

Figure 5:
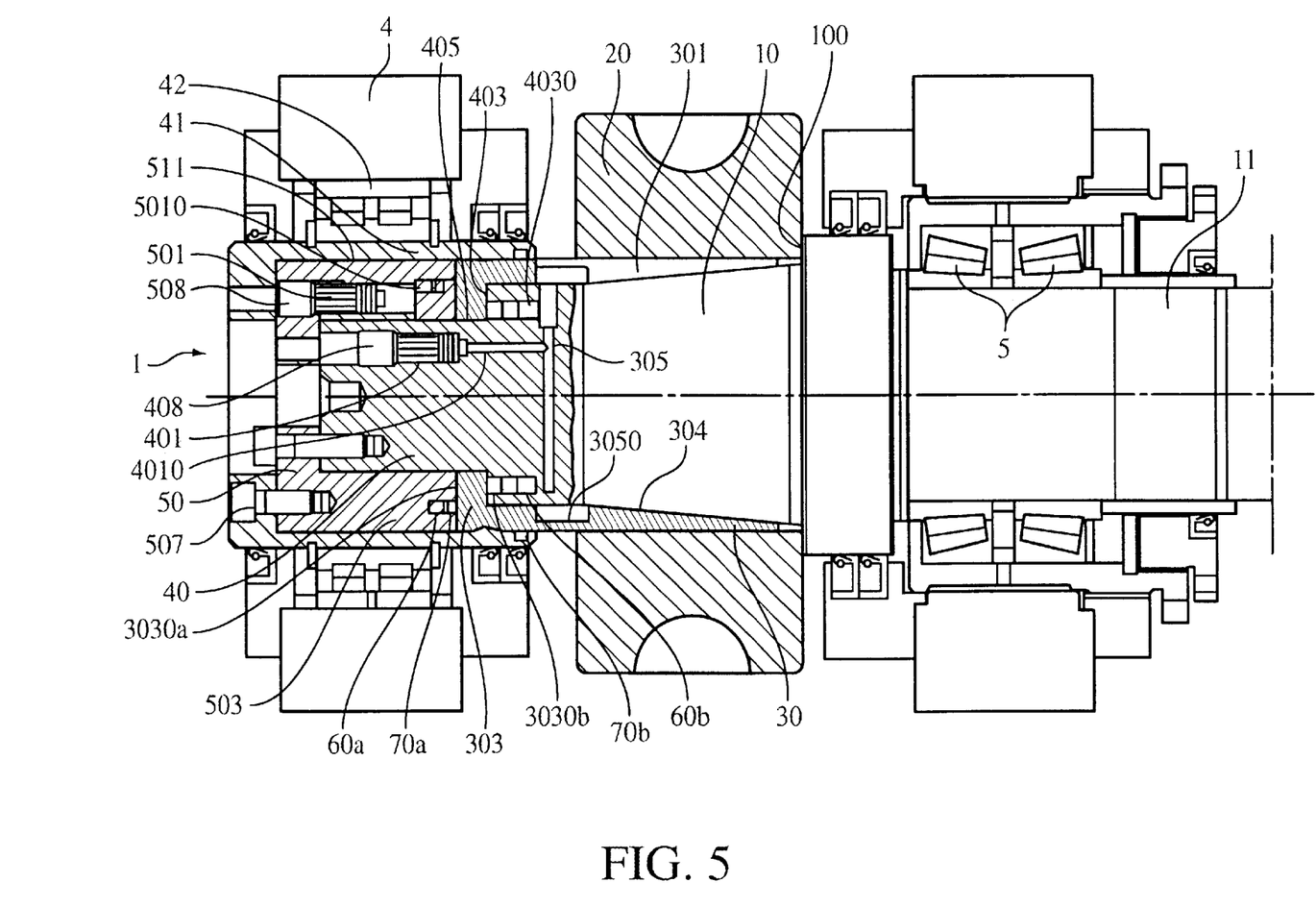
FIG. 5 shows a longitudinal cross section through a hydraulically operated changing device with a double-sided bearing according to the invention.

This embodiment with clamping bushing 31 extended towards the left could be carried out also by using hydraulic operations. An embodiment in which a hydraulically operated changing device is used with a double-sided bearing is shown in FIG. 5. FIG. 5 shows this embodiment with a hydraulic operation; however, the embodiment could also be designed as being mechanically operated. In the embodiment according to FIG. 5, the radial forces emanating from hub part 20 are guided into shaft 11 via clamping bushing 30 and are transferred via the left shaft end and clamping sleeve 50 to bearing sleeve 41 and bearing stand 4. In this embodiment, shaft end 40 is not a screwed-in bolt, but rather is directly part of shaft 11 as a screwed-in bolt would not bring about the necessary radial stiffness or the necessary exactness.

Referring to FIG. 5, the right-hand side shows a conical section 10 of a shaft 11 surrounded by a hub part 20. Hub part 20 rests against a step 100 of shaft 11 and may be, for example a profile-shaping straightening roll or comparable tool, which has to be changed as quickly as possible at low expenditure. Changing device 1 according to the invention permits a quick and simple dismantling of hub part 20, on the one hand, and provides a safe and precise support of hub part 20 on shaft 11. As shown, changing device 1 consists substantially of a clamping bushing 30, a shaft end 40, and a clamping sleeve 50. The clamping sleeve 50 has a cylindrical receiving surface 511 for a bearing sleeve 41, on which is mounted a bearing 42 of bearing stand 4. The outside diameter of receiving surface 511 is slightly smaller than the outside diameter of clamping bushing 30 which receives hub part 20.

The parts shown in FIG. 5 are substantially rotation-symmetric. FIG. 5 shows that within the zone of step 403 extending circumferentially, the shaft end 40 has a groove 4030 extending all around, the groove being open toward the end of shaft end 40. On the bottom of circular groove 4030, provision is made for a sealing ring 60b. A pressure ring 70b is placed on top of sealing ring 60b. Circular step 403 is joined by a second shaft step 405, whose outside diameter is distinctly smaller than circular step 403.

FIG. 5 shows that clamping bushing 30 basically has the shape of a can having its bottom and lid missing. Across about ⅔ of its length, starting from the right end, clamping bushing 30 has a conically tapering inside zone 304 corresponding with conical shaft section 10. Conical inside zone 304 is followed by an internal circumferential groove 3050 and a cylindrical inside zone 305 having a width or bore only slightly larger than the one of circular step 403 of shaft end 40. Following the cylindrical inside zone 305, provision is made for a step 303 extending all around.

FIG. 5 shows that starting from its right-hand end, clamping bushing 30 has a substantially cylindrical outer contour. FIGS. 5 and 2, furthermore, show that clamping bushing 30 has longitudinal slots 301 uniformly distributed over its circumference. Clamping bushing 30 is circumferentially divided by the longitudinal slots 301 into clamping wing sections 308, which can be radially expanded outwardly, which, as explained herein below, is required for flawless radial clamping effect of clamping bushing 30. The longitudinal slots 301 can be cast in elastic sealing compound in order to prevent the penetration of dust or the like. In order to explain the mode of operation of changing device 1 of the invention, the following description describes how the parts are mounted for easier understanding.

When the changing device is assembled, clamping bushing or collet 30 is pushed over shaft end 40 from the left side. After clamping bushing 30 has been completely pushed over shaft end 40, clamping sleeve 50 is then screwed to shaft end 40 until it rests against the end face of shaft end 40.

The radial width of clamping sleeve 50 conforms to approximately the width of step 303 of the clamping bushing 30 extending circumferentially so that clamping sleeve 50 has sufficient space for circular groove 503, with the opening thereof being directed toward the inside step 303 of clamping bushing 30. As in circular groove 4030, there is provided both a sealing ring 60a and pressure ring 70a in circular groove 503.

In FIG. 5, after clamping sleeve 50 has been installed as described above, changing device 1 forms a clamping system which is closed within itself and rigidly connected with shaft end 40. The axial path of displacement of the clamping bushing 30 is limited by clamping sleeve 50 and step 403 of shaft end 40.

FIG. 5 shows changing device 1 in the "unclamped" operating condition. However, the outboard bearing stand 4 with the bearing 42 and the bearing sleeve 41 has already been connected to the clamping sleeve 50 by means of screws 507.

In order to connect hub part 20 to the shaft 11, threaded pin 408 has to be moved to the left as far as possible in order to allow piston 401 to move. Then, by turning the threaded pin 508, piston 501 in clamping sleeve 50 is actuated and generates oil pressure in the circular groove 503 through a hydraulic duct 5010. Pressure build-up is effected on sealing ring 60a and thus also on pressure ring 70a downstream, whereby pressure ring 70a is pressed against the left side 3030a of inside step 303 of clamping bushing 30, attempting to push the latter as far as possible in the direction of conical shaft section 10. Through longitudinal slots 301 of clamping bushing 30, it is now possible for clamping wings 308 to spread radially outwardly in the direction of shaft end 10 in proportion to the axial path of displacement, which results in a clamping effect between clamping bushing 30 and hub part 20, on the one hand, and shaft section 10 on the other hand. This clamping effect is substantial, so that changing device 1 is suitable for transmitting high torque, as well as radial and axial forces between the shaft and the hub even without interconnecting a fitted spring.

To ensure safe clamping, a small gap has to be provided between right side 3030b of step 303 and circular step 403 of shaft end 40, when the changing device is in the clamped condition. It has to be noted here that hub part 20, which prior to clamping is loosely pushed onto clamping bushing 30, is forced, in a defined way, against step 100 of shaft 11 by the movement of clamping bushing 30 to the right. This represents an important adjustment advantage.

When the changing device is to be changed from operating mode "clamped" to operating mode "released", the procedure is as follows:

After removing the screws 507 which connect the bearing sleeve 41 to the clamping sleeve 50, the bearing stand 4 with the bearing 42 and the bearing sleeve 41 can be removed. Threaded pin 508 is moved to the left as far as possible in order to allow piston 501 to move. Oil is supplied via the hydraulic piston 401 of shaft end 40 and received by sealing ring 60b via a hydraulic duct 4010. Similar to the way the "clamping" mode worked in groove 503, oil pressure now builds up in circular groove 4030, and acts on pressure ring 70b via sealing ring 60b. Pressure ring 70b is thereby pressed in the axial direction to the left, out of groove 4030, and thereby acts directly on the right side 3030b of inside step 303, causing the latter to be displaced to the left. Together with the displacement of inside step 303, the entire clamping bushing 30 is simultaneously forced axially to the left as well. Due to their elasticity, clamping wings 308 again move radially inward, returning to their starting positions, which finally cancels the clamping effect between the participating components (shaft section 10, clamping bushing 30, hub part 20). FIG. 5 shows that the maximum axial displacement path of clamping bushing 30 is limited in this connection by the right side of clamping sleeve 50, the latter representing a stop for the left side 3030a of inside step 303. Since the inside diameter 3031 (FIG. 2) of inside step 303 is slightly larger than the outside diameter of the second shaft step 405 of clamping pin 40, the axial displacement of clamping bushing 30 is not obstructed.

Hub part 20 can thus be pulled without any problem from clamping bushing 30 to the left, and thus from shaft end 10 and replaced by another hub part. It has to be noted that a suitable fit is maintained between the outside diameter of clamping bushing 30 and the inside diameter of hub part 20, which, when changing device 1 is in the released condition, permits an easy axial displacement of hub part 20 on clamping bushing 30.

Changing devices 1, 2, 3 for shaft and hub connections described above can be preferably used for rolling mills, straightening machines, tube-welding installations and profiling plants. However, other application cases are, of course, conceivable.

While several embodiments of the present invention have been shown and described, it will be obvious that many changes and modifications may be made thereunto without departing from the spirit and scope of the invention.

What is claimed is:

1. A changing device for quickly changing a hub mounted on an end of a shaft comprising
   (a) a threaded bolt screwed into the shaft end;
   (b) a threaded bushing having a step with an inside thread rotatably connected with the bolt, for effecting axial displacement of the threaded bushing relative to the shaft end;
   (c) a clamping bushing for radially clamping the hub, said clamping bushing disposed between the end of the shaft and the hub and having an inside step and a cylindrical receiving surface for a bearing sleeve for mounting a bearing of a bearing stand, said cylindrical receiving surface having an outside diameter smaller than an inside diameter of the hub;
   (d) a double-sided axial bearing axially fixed on said threaded bushing and transmitting a biaxial displacement of said threaded bushing to said clamping bushing; and
   (e) a retaining ring for pressing the double-sided axial bearing against the inside step of the clamping bushing and causing the axial displacement effected by rotation of the threaded bushing to be transmitted to the clamping bushing.

2. The changing device according to claim 1, wherein said retaining ring has a face side and a recess on the face side.

3. The changing device according to claim 1 wherein said retaining ring is screwed into the threaded bushing.

4. The changing device according to claim 1 wherein said retaining ring is in the form of a collar molded on said clamping bushing.

5. The changing device according to claim 1, wherein said double-sided axial bearing is fixed via a shaft nut against a step of said threaded bushing.

6. The changing device according to claim 5, comprising a sealing ring disposed between said double-sided axial bearing and said shaft nut, and further comprising radial sealing elements fitted in the step.

7. The changing device according to claim 6, wherein said threaded bolt has a flange or step corresponding with a circular deepening of said shaft end.

8. The changing device according to claim 7, wherein said threaded bolt has a cylindrical section corresponding with an inside diameter of said threaded bushing.

9. The changing device according to claim 8, wherein said retaining ring has a nut-shaped end.

10. A changing device for quickly changing a hub mounted on an end of a shaft comprising:
    (a) a threaded bushing having a step with an inside thread rotatably connected with the shaft end for effecting axial displacement of the threaded bushing relative to the shaft end;

(b) a clamping bushing for radially clamping the hub, said clamping bushing disposed between the end of the shaft and the hub and having an inside step and a cylindrical receiving surface for a bearing sleeve for mounting a bearing of a bearing stand;

(c) a double-sided axial bearing axially fixed on said threaded bushing and transmitting a biaxial displacement of said threaded bushing to said clamping bushing; and (d) a retaining ring for pressing the double-sided axial bearing against the inside step of the bushing and causing the axial displacement by rotation of the threaded bushing to be transmitted to the clamping bushing.

11. The changing device according to claim 10 wherein said retaining ring is screwed into the threaded bushing.

12. The changing device according to claim 10 wherein said retaining ring is in the form of a collar molded on said clamping bushing.

13. A hydraulically operated changing device for quickly changing a hub mounted on an end of a shaft comprising:

(a) a clamping bushing for radially clamping the hub, said clamping bushing disposed between the end of the shaft and the hub and having an outside diameter;

(b) a shaft end having a circumferential groove open toward an end of said shaft end, said groove receiving a sealing ring and a pressure ring;

(c) a clamping sleeve having a cylindrical receiving surface for a bearing sleeve for mounting a bearing of a bearing stand, said receiving surface having an outside diameter smaller than the outside diameter of said clamping bushing; and (d) hydraulic means coupled to said clamping sleeve for permitting biaxial displacement of said clamping bushing with respect to said shaft end whereby said clamping sleeve has means for building up pressure in said groove and for venting a flow of hydraulic fluid from said groove to allow the changing device to move from a clamped mode to a released mode so that the hub can be removed from the shaft without removing said clamping bushing or said clamping sleeve from the shaft.

14. The changing device according to claim 13 wherein said clamping bushing has an integrated inside collar for radially clamping the hub upon movement of said clamping bushing to said clamped mode.

15. The changing device according to claim 13 further comprising a retaining ring screwed into said clamping bushing for radially clamping the hub upon movement of said clamping bushing to said clamped mode.

16. A hydraulically operated changing device for quickly changing a hub mounted on an end of a shaft comprising:

(a) a clamping bushing for radially clamping the hub, said clamping bushing disposed between the end of the shaft and the hub and having an outside diameter;

(b) a clamping pin securable to the shaft end and forming an extension of the shaft;

(c) a clamping sleeve having a cylindrical receiving surface for a bearing sleeve for mounting a bearing of a bearing stand, said receiving surface having an outside diameter smaller than the outside diameter of said clamping bushing; and (d) hydraulic means coupled to said clamping sleeve for permitting biaxial displacement of said clamping bushing relative to the shaft end whereby circumferential axial grooves are provided in said clamping sleeve and said clamping pin, said grooves each receiving a sealing ring and a pressure ring for building up pressure in said groove and for venting a flow of hydraulic fluid from said groove to allow the changing device to move from a clamped mode to a released mode so that the hub can be removed from the shaft without removing said clamping bushing or said clamping sleeve from the shaft.

17. A hydraulically operated changing device for quickly changing a hub mounted on an end of a shaft comprising:

(a) a clamping bushing for radially clamping the hub, said clamping bushing disposed between the end of the shaft and the hub and having an inside step and a cylindrical receiving surface for a bearing sleeve for mounting a bearing of a bearing stand;

(b) a shaft end having a circumferential groove open toward an end of said shaft end, said groove receiving a sealing ring and a pressure ring;

(c) a bushing securable to the shaft having an inside step for effecting axial displacement of the bushing relative to the shaft end;

(d) a double-sided axial bearing axially fixed on said bushing and transmitting a biaxial displacement of said bushing to said clamping bushing;

(e) a retaining ring for pressing the double-sided axial bearing against the inside step of the bushing and causing axial displacement of the bushing to be transmitted to the clamping bushing; and (f) hydraulic means coupled to said bushing for permitting biaxial displacement of said bushing with respect to said shaft end whereby said retaining ring has means for building up pressure in said groove and for venting a flow of hydraulic fluid from said groove to allow the changing device to move from a clamped mode to a released mode so that the hub can be removed from the shaft without removing said clamping bushing or said clamping sleeve from the shaft.

18. The changing device according to claim 17 wherein said retaining ring is in the form of a collar molded on said clamping bushing.

19. The changing device according to claim 17 wherein said retaining ring is screwed into said clamping bushing.

20. A hydraulically operated changing device for quickly changing a hub mounted on an end of a shaft comprising:

(a) a clamping bushing for radially clamping the hub, said clamping bushing disposed between the end of the shaft and the hub and having an inside step and a cylindrical receiving surface for a bearing sleeve for mounting a bearing of a bearing stand;

(b) a clamping pin securable to the shaft and forming an extension of the shaft, said clamping pin having a circumferential groove open toward an end of said clamping pin, said groove receiving a sealing ring;

(c) a bushing securable to the shaft having an inside step for effecting axial displacement of the bushing relative to the clamping pin;

(d) a double-sided axial bearing axially fixed on said bushing and transmitting a biaxial displacement of said bushing to said clamping bushing;

(e) a retaining ring for pressing the double-sided axial bearing against the inside step of the bushing and causing axial displacement of the bushing to be transmitted to the clamping bushing; and (f) hydraulic means coupled to said bushing for permitting biaxial displacement of said bushing with respect to said shaft end whereby said retaining ring has means for building up pressure in said groove and for venting a flow of hydraulic fluid from said groove to allow the changing device to move from a clamped mode to a released mode so that the hub can be removed from the shaft without removing said clamping bushing from the shaft.

21. The changing device according to claim 20 wherein said retaining ring is in the form of a collar molded on said clamping bushing.

22. The changing device according to claim 20 wherein said retaining ring is screwed into said clamping bushing.

* * * * *